United States Patent
Shah et al.

(10) Patent No.: US 11,862,040 B2
(45) Date of Patent: Jan. 2, 2024

(54) METHODS AND SYSTEMS FOR PROVIDING BROWSER-BASED CUSTOMIZED GAME BASED MULTIMODAL LEARNING AND ASSESSMENT FRAMEWORK

(71) Applicant: Tata Consultancy Services Limited, Mumbai (IN)

(72) Inventors: Viral Prakash Shah, Thane West (IN); Giscard Philip Surendra Ferrao, Thane West (IN); Rajesh Sundaresan, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/070,587

(22) Filed: Nov. 29, 2022

(65) Prior Publication Data
US 2023/0386354 A1    Nov. 30, 2023

(30) Foreign Application Priority Data
May 26, 2022    (IN) .............................. 202221030272

(51) Int. Cl.
*G09B 7/00* (2006.01)
(52) U.S. Cl.
CPC ..................... *G09B 7/00* (2013.01)
(58) Field of Classification Search
CPC ..................................................... G09B 7/00
See application file for complete search history.

(56) References Cited

U.S. PATENT DOCUMENTS

2003/0148806 A1*    8/2003    Weiss .................. G07F 17/3232
463/20
2004/0009462 A1*    1/2004    McElwrath .............. G09B 7/00
434/350
(Continued)

FOREIGN PATENT DOCUMENTS

CN          108022462 A    5/2018
EP          1 783 768 A3   5/2009
(Continued)

OTHER PUBLICATIONS

Del Blanco et al., "Easing Assessment of Game-based Learning with <e-Adventure> and LAMS," (2010).
(Continued)

*Primary Examiner* — Eddy Saint-Vil
(74) *Attorney, Agent, or Firm* — Finnegan, Henderson, Farabow, Garrett & Dunner LLP (57) ABSTRACT

The present disclosure addresses unresolved problem of monopoly in content authoring, creation of dependency loop by providing a single, scalable, one-stop knowledge platform offering high degree of customization by multiple users and leveraging emerging technologies for rapid end-to-end game or learning solutions development. Embodiment of the present disclosure provides methods and systems for providing customized game-based learning and assessment framework. The present disclosure provides a mechanism to configure custom content into a readymade learning and assessment platform. The framework proposed in the present disclosure is custom built to support scalable architecture of a modular digital learning platform, and its functionalities. The system of the present disclosure allows content creators to author custom content to create immersive learning experience that could range from Spatial three-dimen- (Continued)

sional (3D) technologies, Augmented Reality (AR) and Virtual Reality (VR) or games at one place.

9 Claims, 4 Drawing Sheets

(56) References Cited

U.S. PATENT DOCUMENTS

| | | | | |
|---|---|---|---|---|
| 2006/0204942 A1* | 9/2006 | Kimball | ............... | G09B 7/00 |
| | | | | 434/362 |
| 2007/0099161 A1* | 5/2007 | Krebs | ............... | G09B 7/00 |
| | | | | 434/362 |
| 2014/0087355 A1* | 3/2014 | Henry | ............... | G09B 7/00 |
| | | | | 434/362 |
| 2014/0147824 A1* | 5/2014 | Kumar T | ............ | G09B 5/00 |
| | | | | 434/350 |

FOREIGN PATENT DOCUMENTS

| | | |
|---|---|---|
| KR | 10-2005-0104935 | 11/2005 |
| KR | 10-2008-0013327 | 2/2008 |

OTHER PUBLICATIONS

Roberts et al., "Learning-Based Procedural Content Generation," (2013).

* cited by examiner

METHODS AND SYSTEMS FOR PROVIDING BROWSER-BASED CUSTOMIZED GAME BASED MULTIMODAL LEARNING AND ASSESSMENT FRAMEWORK

PRIORITY CLAIM

This U.S. patent application claims priority under 35 U.S.C. § 119 to: India Application No. 202221030272, filed on May 26, 2022. The entire contents of the aforementioned application are incorporated herein by reference.

TECHNICAL FIELD

The embodiments herein generally relate to game-based learning and, more particularly, to methods and systems for providing browser-based customized game based multimodal learning and assessment framework.

BACKGROUND

With emergence of intelligent learning and teaching systems in multiple areas, computer-based training that generally uses a learning management system in the form of computer-based training systems and web-based training systems has become an integral part of multiple industries and domains. Further, gamification in learning as an approach to education intends to motivate users into learning through game elements in a learning environment. Gamified learning enables maximizing enjoyment and engagement, and capturing learners' voluntary interest, thus inspiring them for further learning. Traditionally, gamified learning-based systems provide courseware along with online tutoring, and allows users to create and manage learning contents. However, existing game development systems fail to leverage emerging technologies for rapid end-to-end game or learning and assessment solutions development.

SUMMARY

Embodiments of the present disclosure present technological improvements as solutions to one or more of the above-mentioned technical problems recognized by the inventors in conventional systems. For example, in one embodiment, a method for providing browser-based customized game based multimodal learning and assessment framework is provided. The method includes receiving, via one or more hardware processors, a plurality of game file templates and corresponding metadata from a dynamically updated database, as input to a game instantiation component of a configurable gamification application, wherein the plurality of game file templates comprises information pertaining to one or more type of games, one or more type of gamified activities, and one or more type of simulations; obtaining, via the one or more hardware processors, one or more customized learning and assessment content features from one or more domain experts of the configurable gamification application; selecting, via the one or more hardware processors, a game file template from the plurality of game file templates based on one or more user requirements; associating, via the one or more hardware processors, the one or more customized learning and assessment content features in a language of interest with the selected game file template to obtain a gamified content; checking, via the one or more hardware processors, compliance of the gamified content for a sharable content object reference model (SCORM); and outputting, via the one or more hardware processors, SCORM compliant gamified content on a display device to an end user.

In another embodiment, a system for providing browser-based customized game based multimodal learning and assessment framework is provided. The system comprises a memory storing instructions; one or more Input/Output (I/O) interfaces; and one or more hardware processors coupled to the memory via the one or more I/O interfaces, wherein the one or more hardware processors are configured by the instructions to receive, a plurality of game file templates and corresponding metadata from a dynamically updated database, as input to a game instantiation component of a configurable gamification application, wherein the plurality of game file templates comprises information pertaining to one or more type of games, one or more type of gamified activities, and one or more type of simulations; obtain, one or more customized learning and assessment content features from one or more domain experts of the configurable gamification application; select, a game file template from the plurality of game file templates based on one or more user requirements; associate, via the one or more hardware processors, the one or more customized learning and assessment content features in a language of interest with the selected game file template to obtain a gamified content; check, compliance of the gamified content for a sharable content object reference model (SCORM); and output, SCORM compliant gamified content on a display device to an end user.

In yet another embodiment, there are provided one or more non-transitory machine-readable information storage mediums comprising one or more instructions, which when executed by one or more hardware processors causes a method for providing browser-based customized game based multimodal learning and assessment framework. The method includes receiving, via one or more hardware processors, a plurality of game file templates and corresponding metadata from a dynamically updated database, as input to a game instantiation component of a configurable gamification application, wherein the plurality of game file templates comprises information pertaining to one or more type of games, one or more type of gamified activities, and one or more type of simulations; obtaining, via the one or more hardware processors, one or more customized learning and assessment content features from one or more domain experts of the configurable gamification application; selecting, via the one or more hardware processors, a game file template from the plurality of game file templates based on one or more user requirements; associating, via the one or more hardware processors, the one or more customized learning and assessment content features in a language of interest with the selected game file template to obtain a gamified content; checking, via the one or more hardware processors, compliance of the gamified content for a sharable content object reference model (SCORM); and outputting, via the one or more hardware processors, SCORM compliant gamified content on a display device to an end user.

In accordance with an embodiment of the present disclosure, the plurality of game file templates comprise one or more game functionalities in a specific format.

In accordance with an embodiment of the present disclosure, the one or more customized learning and assessment content features include relative path of textual learning documents, images, videos with textual content, questionnaire, spatial three-dimensional (3D) models, immersive augmented reality based features, experiential learning based features, and virtual reality based features.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Gamification in learning as an approach to education intends to motivate users into learning through game elements in a learning environment. Gamified learning enables maximizing enjoyment and engagement, and capturing learners' interest, thus inspiring them for further learning. Traditionally, gamified learning-based systems provide courseware along with online tutoring, and allows users to create and manage learning contents. However, conventional game development systems fail to provide a single, browser-based, scalable, one-stop knowledge platform offering high degree of customization and leveraging emerging technologies for rapid end-to-end game or multi-modal learning and assessment solutions development. Embodiment of the present disclosure provides methods and systems for providing browser-based customized game-based multi-modal learning and assessment framework. The present disclosure provides a mechanism to configure custom content into a readymade learning and assessment platform. The framework proposed in the present disclosure is custom built to support scalable architecture of a modular digital learning platform, and its functionalities. Building blocks of the framework expand capabilities of the modular digital learning platform while also keeping proprietary Learning and Assessment components within user-generated custom content.

The system of the present disclosure allows content creators to author custom content to create an immersive learning experience that could range from Spatial two-dimensional (2D) as well as three-dimensional (3D) technologies, Augmented Reality (AR) and Virtual Reality (VR) or games at one place. Further, the framework that features a robust learning management system (LMS) integration, along with a vast content marketplace, enables rapid game authoring and reduces game development cycle time to a large extent while raising bar for quality solutions. A multitude of content creators spread across different geographies get to pick and choose a suitable learning and assessment cartridge from a catalog of the digital learning platform of the present disclosure to quickly craft enhanced multimodal learning and assessment solutions for the modern learner through simplified game development process. The framework of the present disclosure is a multifaceted custom framework, supporting creation of 2D games as well as paving way for democratized, engaging, and immersive learning, tapping into the potential of AR, VR and Spatial 3D technologies. Each customizable, configurable learning and assessment solution offered under the framework of the present disclosure is pre-built with gameplay logic, player progression logic, leaderboard, user experience (UX), feedback mechanisms, scoring logic, micro interactions and LMS integration.

Referring now to the drawings, and more particularly to FIGS. 1 through 3B, where similar reference characters denote corresponding features consistently throughout the figures, there are shown preferred embodiments and these embodiments are described in the context of the following exemplary system and/or method.

Figure 1:
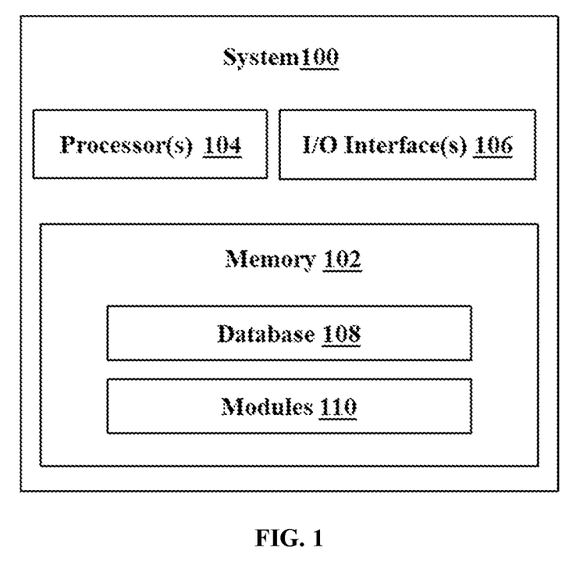
FIG. 1 is a functional block diagram of a system for providing browser-based customized game-based multimodal learning and assessment framework, in accordance with some embodiments of the present disclosure.

FIG. 1 is a functional block diagram of a system for providing browser-based customized game-based multimodal learning and assessment framework, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a plurality of modules 110 (not shown) required for execution of functions of system 100. Furthermore, the memory 102 includes a database 108 that stores a plurality of game file templates and corresponding metadata, multimodal learning and assessment content features, obtained gamified content, sharable content object reference model, and/or the like. Further, the memory 102 may comprise information pertaining to input (s)/output(s) of each step performed by the processor(s) 104 of the system 100 and methods of the present disclosure. In an embodiment, the database 108 may be external (not shown) to the system 100 and coupled to the system via the I/O interface 106. In an embodiment, the system 100 operate in conjunction with a configurable gamification application 112. Functions of the components of the system 100 are explained in conjunction with flow diagram of FIG. 2, architectural overview of the gamification application in FIG. 3A, and architectural diagram of the game file template in FIG. 3B.

Figure 2:
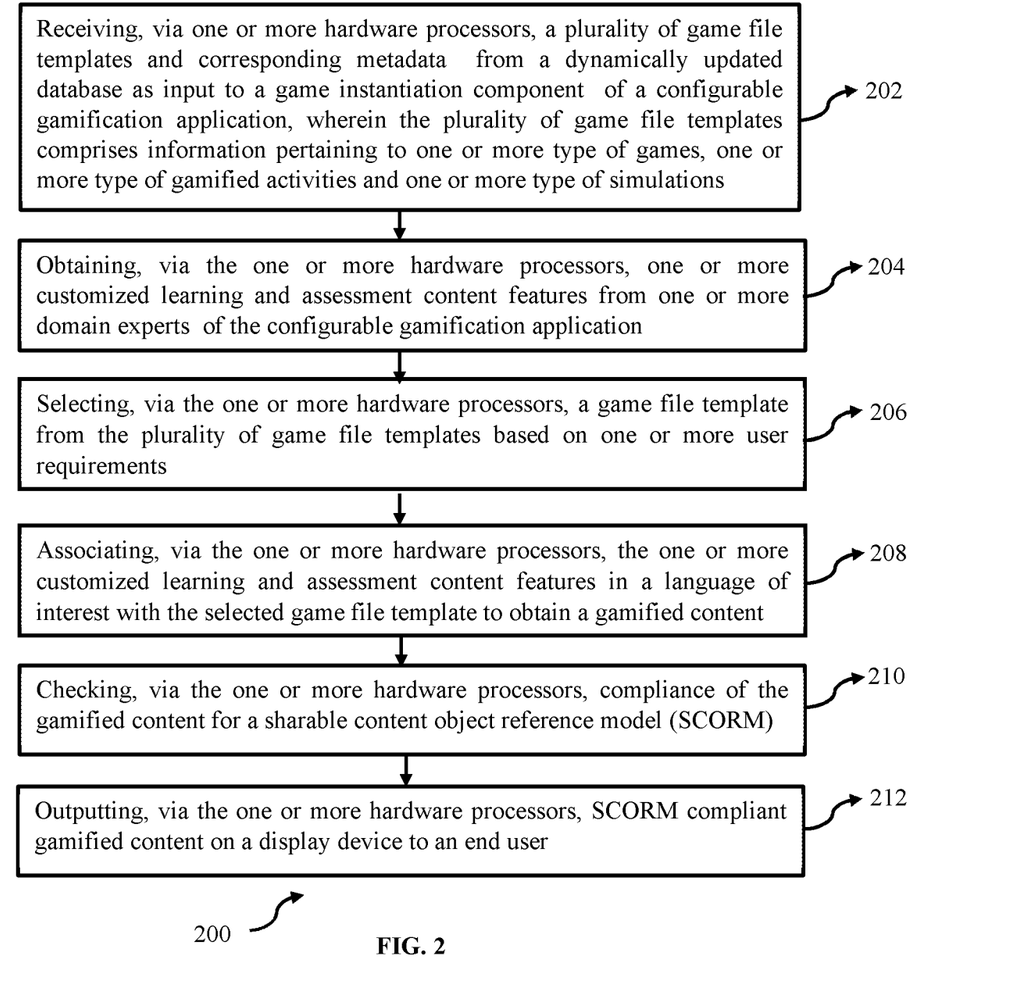
FIG. 2 is a flow diagram illustrating a method 300 for providing the browser-based customized game-based multimodal learning and assessment framework, using the system of FIG. 1, in accordance with some embodiments of the present disclosure.

FIG. 2 is a flow diagram illustrating the method 200 for providing browser-based customized game-based multimodal learning and assessment framework, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 200 as depicted in FIG. 1, the steps of flow diagram as depicted in FIG. 2, architectural overview in FIG. 3A, and architectural diagram of the game file template in FIG. 3B. Although process steps, method steps, techniques or the like may be described in a sequential order, such processes, methods, and techniques may be suitably configured to work in alternate orders. In other words, any sequence or order of steps that may be described does not necessarily indicate a requirement that the steps to be performed in that order. The steps of processes described herein may be performed in any order. Further, some steps may be performed simultaneously.

Figure 3A:
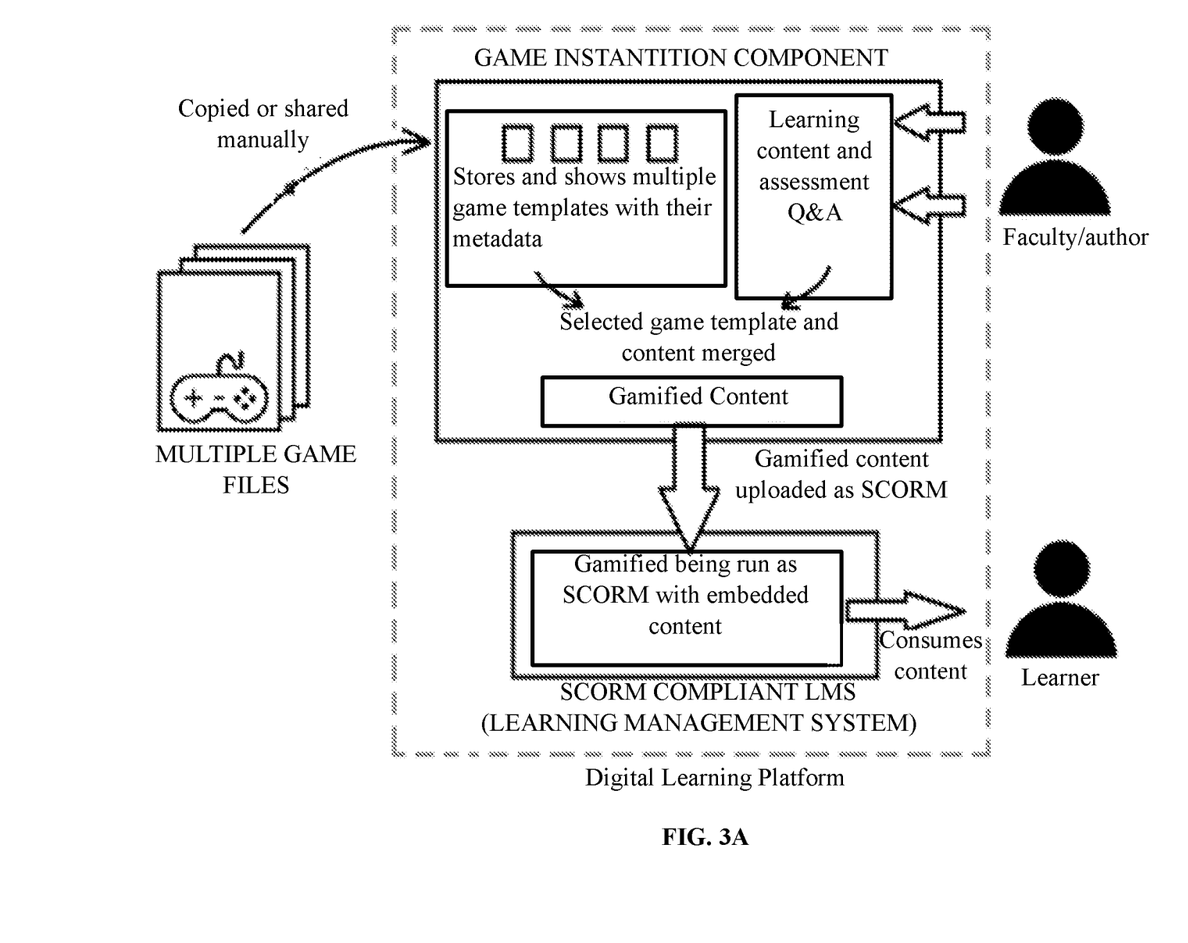
FIG. 3A illustrates an architectural overview of the gamification application of the system of FIG. 1 for providing the browser-based customized game-based multimodal learning and assessment framework, in accordance with some embodiments of the present disclosure.

Referring to the steps of the method 200 in FIG. 2, at step 202, the one or more hardware processors 104 are configured to receive, a plurality of game file templates and corresponding metadata from a dynamically updated database, as input to a game instantiation component of a configurable gamification application. In an embodiment, the gamification application refers to any scenario or situation in which it is desirable to apply gamification concepts. The configurable gamification application is designed based on a concept which allows gamification of learning including online course documents, audio, video and 3D content and assessment in a simple way for content creators. FIG. 3A illustrate an architectural overview of the configurable gamification application for providing browser-based customized game-based multimodal learning and assessment framework, in accordance with some embodiments of the present disclosure. As can be seen in FIG. 3A, the configurable gamification application runs on three main components namely the game file templates (alternatively referred as game files), the game instantiation component, and a sharable content object reference model (SCORM) compliant learning management system (LMS).

The game file template is not a web application, but a file which does comprise a pre-defined format. The game file template represents a ZIP file containing HTML content, videos, images, JavaScript, bundled in a proprietary format, which is an extension of SCORM format. The game file template contains game logic to run the game and could be like an EXE which is an executable file, but it gets executed only from within the SCORM compliant LMS. The game instantiation component represents a software which may be configured to a) Read the Games File, and b) display its corresponding metadata. Here, the corresponding meta data may include but not limited to name, description, preview images, and/or the like. Further, user inputs are received by the game instantiation component for Learning Content and Assessment Questions and answers. The Learning Content, and assessment content is plugged into the Games File templates's provided placeholders to create a new packaged instance of the game file template. In an embodiment, the SCORM compliant LMS could be any LMS, which knows how to play a SCORM file. Since the game is essentially a SCORM, it can be played on any SCORM Compliant LMS.

In an embodiment, the plurality of game file templates comprises information pertaining to one or more type of games, one or more type of gamified activities and one or more type of simulations. In other words, the plurality of game file templates comprises ready-to-configure cartridges, which are categorized into 3 types, namely game-based cartridges, gamified activities-based cartridges and simulation-based cartridges. All these cartridges are device and platform agnostic, and provide a learner/end user an ability to consume learning and assessment content within an internet browser. Each cartridge is uniquely created to address a specific learning/assessment need, such as teaching someone learn about school mathematics or to train someone about safety drill, or a virtual corporate onboarding exercise, but all these cartridges are built using an underlying common framework that is built as modules to work together to create required learning objectives. In an embodiment, the plurality of game file templates includes one or more game functionalities in a specific format. The one or more game functionalities may include but may not be limited to goals and rules, challenges, progress tracker, user interface, pedagogy, interactions, roleplay characters, feedback and scoring mechanism, decision tree, single/multiplayer, leaderboard, rewards, and fictional storyline.

Figure 3B:
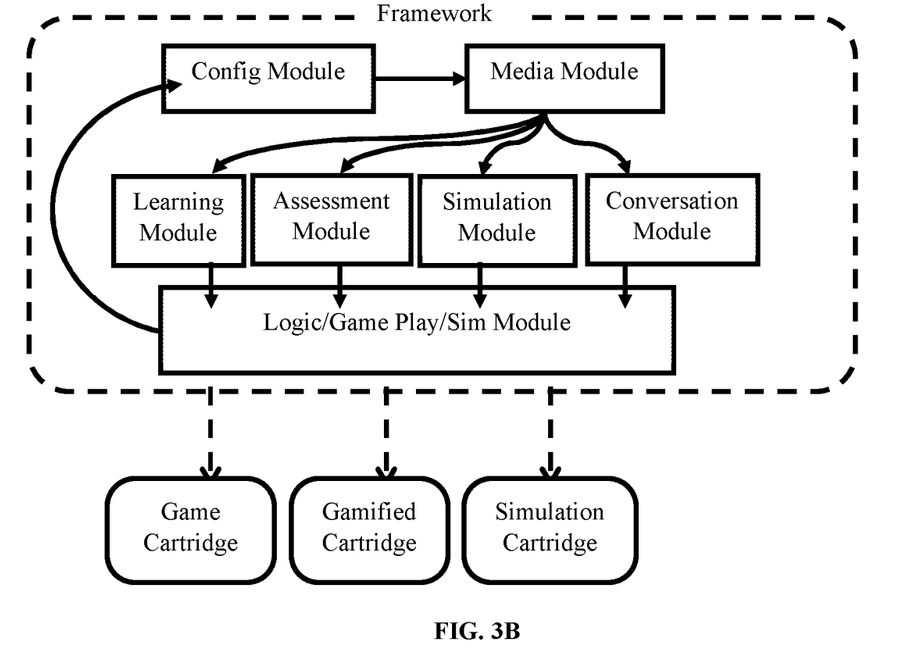
FIG. 3B illustrate architectural diagram of a game file template showing interaction of various modules of the system of FIG. 1 for providing the browser-based customized game-based multimodal learning and assessment framework, in accordance with some embodiments of the present disclosure.

In an embodiment, the plurality of game file templates further comprises a plurality of modules that are stored in the dynamically updated database. The plurality of modules includes a configuration module (categorized as root folder), a learning module, an assessment module, a conversation module and a media module. FIG. 3B illustrates architectural diagram of a game file template showing interaction of various modules of the system of FIG. 1 for providing the customized game-based learning and assessment framework, in accordance with some embodiments of the present disclosure. The configuration module is in format of XML and contains informative data for a specific type of game solution. The informative data may include but may not be limited to number of stages, default language, whether difficulty level option should be shown, whether leaderboard should be shown, header image, banner image, which stage learning data should be shown and which stage assessment should be shown. The game instantiation component of the configurable gamification application can read and also change data in this XML based on inputs received from a creator or an author of the gamification application regarding how the game should be run. The learning module is in format of XML and contains, in a fixed format, the relative paths of the learning documents, images, videos along with textual content that the game has to show to the learner, during various stages like the configuration module, the game instantiation component can read and also change data in this XML based on inputs received from the creator or the author. The author can give their own text/videos to go with the game in the game instantiation component. The assessment module is in format of XML and contains, in a fixed format, assessment data such as questions, their answers (options for MCQ, MSQ, text for textual answers), whether to group questions in the game, and/or the like. Once again, in the game Instantiation Component, the author can give their own question and answers and they are replaced in the XML by this component. So, the game instantiation component changes data in this XML while merging and creating gamified content. The conversation module is in format of XML and contains screen-wise, conversational dialogues of the game. These are provided language-wise so appropriate dialogues are shown based on user selected language. The media module contains an assessment folder that stores all the files (Images, videos.) referenced in the assessment modules, a learning folder that stores all files (PDF, Images, videos) referenced in the learning module and an internal media folder storing other media files of the game.

Further, at step 204 of FIG. 2, the one or more hardware processors 104 are configured to obtain one or more customized learning and assessment content features from one or more domain experts of the configurable gamification application. In an embodiment, the one or more domain experts could be the author or creator of the gamification application. In an embodiment, the one or more customized learning and assessment content features include relative path of textual learning documents, images, videos with textual content, questionnaire, spatial three dimensional (3D) models, immersive augmented reality based features, experiential learning based features, and virtual reality based features. In another embodiment, the present disclosure provides high level of customization by way of the game-based cartridges, gamified-activities based cartridges and simulations-based cartridges. In the games-based cartridges, learner-centric learning and assessment solutions are created by embedding them within a game, with a set storyline that has twists and turns and a final objective. Here, a learner earns rewards for every step of progress and has setbacks for poor performance. Learning and assessment are facilitated within such a game in a configurable linear and non-linear randomized methods which provides the learner a unique game play for every attempt using the in-built game play mechanics functions defined within game logic and game play modules present within the game cartridge. This may include the learning and/or assessment constructed using multiple choice, multiple selection, comprehension, true or false type questions that can be quickly integrated within a fictional game with multiple levels of achievements where the learner is able to focus on the game play and fictional objective defined within the game storyline, through various unique ways to progress the game and complete the game mission to satisfaction. For example, a teacher wants to engage students in an enjoyable learning/assessment when the goal is to give the students multiple ways to revise the subject/topic while keeping the student engaged throughout the session. A game-based solution functions to address this need while keeping the learning performance of the student at center of this experience enabling them to progress within the game while also making them familiar within the subject/topic they are learning or getting self-assessed. Progress of the student is realized within a game user interface that is inbuilt within the game-based cartridge to share information such as player score, level progress, badges earned, leaderboard, and or the like.

In gamified activities bases cartridges, learning and assessment content of different types are integrated within a gamified setup complete with rules, score guidelines, leader boards for real-time updates. An assessment constructed using multiple choice, multiple selection, comprehension, short answer, true or false questions, which are used to assess student's ability to understand a specific subject or a topic, by attempting several sets of questions generally becomes monotonous and soon laborious within short while. However, when same assessments are introduced using a gamification layer, significant progress is observed since the gamified activities-based cartridge creates reward points and short achievement milestones, and ability to quickly see self-progress in comparison to similar respondents and able to self-motivate and pursue further levels of knowledge. Further, when introduced along with easy-to-use configuration methods built within the gamified activities based cartridges, it becomes part of the configuration process of the gamified activity based cartridge to facilitate the users who has inclination towards creating such assessment content without any pre-requisite. Here, the easy-to-use configuration methods built within the gamified activities-based cartridges may include enabling a randomized assessment question, adaptive question selection, language selection option, leaderboard, display of feedback, display of hints, and/or the like.

In the simulation-based cartridges, spatial learning and assessment solutions are created with use of available rich media library, enabling exploratory and experiential learning that can be applied for safety training, virtual tours and other meaningful use cases. the simulation-based cartridge enabled with learning/assessment content using any or all question types, such as multiple selection, multiple choice, true or false, comprehension, and/or the like can be created for specific or generic simulated learning/assessment purposes. Such cartridges enable anyone to add a 3D model or 360 image or video to quickly author them with learning content or assessment content, using hotspots that allow the learner to either find them, tag them with correct answers or identify a part of a 3D model that itself is part of an assessment question. The simulation-based cartridge provides ability to quickly create a hotspot based spatial assessment and learning, using uploaded media or links to existing online media such as YouTube video, or an image from public domain.

Referring back to FIG. 2, at step 206 of FIG. 2, the one or more hardware processors 104 are configured to select a game file template from the plurality of game file templates (as shown in second row of FIG. 3A) based on one or more user requirements. In other words, a cartridge from the ready-to-configure cartridges is selected to address the one or more user requirements or specific learning/assessment need, such as teaching someone learn about chemistry to prepare a chemical substance, or a virtual corporate onboarding exercise, and/or the like.

Further, at step 208 of FIG. 2, the one or more hardware processors 104 are configured to associate the one or more customized learning and assessment content features in a language of interest with the selected game file template to obtain a gamified content (as shown in second row of FIG. 3A). Here, the language of interest could be any language spoken and known by the author, creator, and/or end users. In other words, the selected cartridge gets instantiated while allowing the content creator to add relevant learning or assessment content into the cartridge.

Furthermore, at step 210 of FIG. 2, the one or more hardware processors 104 are configured to check compliance of the gamified content (as shown in third row of FIG. 3A) for a sharable content object reference model (SCORM). When the gamified content is found to be SCORM compliant, at step 212 of FIG. 2, the one or more hardware processors 104 are configured to output the SCORM compliant gamified content on a display device to an end user. As shown in FIG. 3A, the gamified content is uploaded as SCORM in the SCORM compliant LMS and consumed by a learner when found SCORM complaint. In an embodiment, the SCORM compliant gamified content could be displayed as a leadership dashboard, rewards earned, and/or the like. In an embodiment, the display device could be a monitor, a TV screen, a display console, and/or the like. In other words, the learner gets access to the gamified content through the SCORM compliant LMS.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The present disclosure addresses unresolved problem of monopoly in content authoring, creation of dependency loop by providing a single, scalable, one-stop knowledge platform offering high degree of customization and leveraging emerging technologies for rapid end-to-end game or learning solutions development. Embodiment of the present disclosure provides methods and systems for providing customized game-based learning and assessment framework. The present disclosure provides a mechanism to configure custom content into a readymade learning and assessment platform. The framework proposed in the present disclosure is custom built to support scalable architecture of a modular digital learning platform, and its functionalities. Building blocks of the framework expand capabilities of the modular digital learning platform while also keeping proprietary Learning and Assessment components within user-generated custom content. The system of the present disclosure allows content creators to author custom content to create immersive learning experience that could range from Spatial three dimensional (3D) technologies, Augmented Reality (AR) and Virtual Reality (VR) or games at one place.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
generating, via one or more hardware processors, a configurable gamification application based on gamification of learning including online course documents, an audio, a video, and 3D content and assessment, wherein the configurable gamification application includes a game instantiation component,
the configurable gamification application is a browser-based customized game-based multimodal learning and assessment framework,
the configurable gamification application runs on three components,
the three components include a plurality of game file templates, the game instantiation component, and a sharable content object reference model (SCORM) compliant learning management system (LMS), and
the game instantiation component represents a software which is configured to:
a) read a game file of the plurality of game file templates, and
b) display corresponding metadata of the game file;
receiving, via the one or more hardware processors, the plurality of game file templates and the corresponding metadata from a dynamically updated database, as an input to the game instantiation component of the configurable gamification application, wherein the plurality of game file templates comprises information pertaining to one or more type of games, one or more type of gamified activities, and one or more type of simulations;
obtaining, via the one or more hardware processors, one or more customized learning and assessment content features from one or more domain experts of the configurable gamification application;
selecting, via the one or more hardware processors, a game file template of the plurality of game file templates based on one or more user requirements;
associating, via the one or more hardware processors, the one or more customized learning and assessment content features in a language of interest with the selected game file template;
obtaining, via the one or more hardware processors, gamified content based on the association;
determining, via the one or more hardware processors, whether the obtained gamified content is in compliant with respect to a sharable content object reference model (SCORM); and
outputting, via the one or more hardware processors, the obtained gamified content on a display device, wherein the output of the gamified content is based on the determination that the gamified content is in complaint with respect to the SCORM.

2. The processor implemented method of claim 1, wherein the plurality of game file templates comprises one or more game functionalities in a specific format.

3. The processor implemented method of claim 1, wherein the one or more customized learning and assessment content features include relative path of textual learning documents, images, videos with textual content, questionnaire, spatial three-dimensional (3D) models, immersive augmented reality based features, experiential learning based features, and virtual reality based features.

4. A system, comprising:
a memory storing instructions;
one or more Input/Output (I/O) interfaces; and
one or more hardware processors coupled to the memory via the one or more I/O interfaces, wherein the one or more hardware processors are configured by the instructions to:
generate a configurable gamification application based on gamification of learning including online course documents, an audio, a video, and 3D content and assessment, wherein
the configurable gamification application includes a game instantiation component,
the configurable gamification application is a browser-based customized game-based multimodal learning and assessment framework,
the configurable gamification application runs on three components,
the three components include a plurality of game file templates, the game instantiation component, and a sharable content object reference model (SCORM) compliant learning management system (LMS), and
the game instantiation component represents a software which is configured to:
a) read a game file of the plurality of game file templates, and
b) display corresponding metadata of the game file;
receive the plurality of game file templates and the corresponding metadata from a dynamically updated database as an input to the game instantiation component of the configurable gamification application, wherein the plurality of game file templates comprises information pertaining to one or more type of games, one or more type of gamified activities and one or more type of simulations;
obtain one or more customized learning and assessment content features from one or more domain experts of the configurable gamification application;
select a game file template of the plurality of game file templates based on one or more user requirements;
associate the one or more customized learning and assessment content features in a language of interest with the selected game file template;
obtain gamified content based on the association;
determine, whether the obtained gamified content is in compliant with respect to a sharable content object reference model (SCORM); and
output, the obtained gamified content on a display device, wherein the output of the gamified content is based on the determination that the gamified content is in complaint with respect to the SCORM.

5. The system of claim 4, wherein the plurality of game file templates comprises one or more game functionalities in a specific format.

6. The system of claim 4, wherein the one or more customized learning and assessment content features include relative path of textual learning documents, images, videos with textual content, questionnaire, spatial three-dimensional (3D) models, immersive augmented reality based features, experiential learning based features, and virtual reality based features.

7. One or more non-transitory computer readable mediums comprising one or more instructions which when executed by one or more hardware processors cause:

generating a configurable gamification application based on gamification of learning including online course documents, an audio, a video, and 3D content and assessment, wherein
the configurable gamification application includes a game instantiation component,
the configurable gamification application is a browser-based customized game-based multimodal learning and assessment framework,
the configurable gamification application runs on three components,
the three components include a plurality of game file templates, the game instantiation component, and a sharable content object reference model (SCORM) compliant learning management system (LMS), and
the game instantiation component represents a software which is configured to:
a) read a game file of the plurality of game file templates, and
b) display corresponding metadata of the game file;
receiving the plurality of game file templates and the corresponding metadata from a dynamically updated database, as an input to the game instantiation component of the configurable gamification application, wherein the plurality of game file templates comprises information pertaining to one or more type of games, one or more type of gamified activities, and one or more type of simulations;
obtaining one or more customized learning and assessment content features from one or more domain experts of the configurable gamification application;
selecting a game file template of the plurality of game file templates based on one or more user requirements;
associating the one or more customized learning and assessment content features in a language of interest with the selected game file template;
obtaining, via the one or more hardware processors, gamified content based on the association;
determining whether the obtained gamified content is in compliant with respect to a sharable content object reference model (SCORM); and
outputting, the obtained gamified content on a display device, wherein the output of the gamified content is based on the determination that the gamified content is in complaint with respect to the SCORM.

8. The non-transitory computer readable mediums of claim 7, wherein the plurality of game file templates comprises one or more game functionalities in a specific format.

9. The non-transitory computer readable mediums of claim 7, wherein the one or more customized learning and assessment content features include relative path of textual learning documents, images, videos with textual content, questionnaire, spatial three-dimensional (3D) models, immersive augmented reality based features, experiential learning based features, and virtual reality based features.

* * * * *